US010390071B2

(12) United States Patent
Sethuraman et al.

(10) Patent No.: US 10,390,071 B2
(45) Date of Patent: Aug. 20, 2019

(54) CONTENT DELIVERY EDGE STORAGE OPTIMIZED MEDIA DELIVERY TO ADAPTIVE BITRATE (ABR) STREAMING CLIENTS

(71) Applicant: ITTIAM SYSTEMS (P) LTD., Bangalore (IN)

(72) Inventors: Sriram Sethuraman, Bangalore (IN); Murali Babu Muthukrishnan, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 0 days.

(21) Appl. No.: 15/486,327

(22) Filed: Apr. 13, 2017

(65) Prior Publication Data
US 2017/0302981 A1    Oct. 19, 2017

(30) Foreign Application Priority Data
Apr. 16, 2016    (IN) .............................. 201641013318

(51) Int. Cl.
| H04N 21/266 | (2011.01) |
| H04N 21/2662 | (2011.01) |
| H04N 21/236 | (2011.01) |
| H04N 21/235 | (2011.01) |
| H04N 19/51 | (2014.01) |

(Continued)

(52) U.S. Cl.
CPC ....... *H04N 21/2662* (2013.01); *H04N 19/146* (2014.11); *H04N 19/162* (2014.11); *H04N 19/30* (2014.11); *H04N 19/40* (2014.11); *H04N 19/46* (2014.11); *H04N 19/51* (2014.11); *H04N 21/235* (2013.01); *H04N 21/236* (2013.01); *H04N 21/234354* (2013.01); *H04N 21/6587* (2013.01); *H04N 21/8456* (2013.01)

(58) Field of Classification Search
None
See application file for complete search history.

(56) References Cited

U.S. PATENT DOCUMENTS

| 6,580,754 B1 * | 6/2003 | Wan ............... H04N 21/234327 375/240.01 |
| 6,769,127 B1 * | 7/2004 | Bonomi ................. H04H 60/72 725/39 |

(Continued)

*Primary Examiner* — An Son P Huynh
(74) *Attorney, Agent, or Firm* — Prakash Nama; Global IP Services, PLLC

(57) ABSTRACT

A system includes an interface unit to receive a request, from a media client, to obtain a segment of media content at an ABR representation, and a transcoding unit. The transcoding unit includes a scalable decoder, hint stream decoder, and re-encoder. The scalable decoder receives and decodes a set of two or more layers of a scalable coded representation corresponding to the requested segment of media content at the requested ABR representation to provide a set of media frames and scalable stream information for the segment. The hint stream decoder receives and decodes a hint stream corresponding to the requested segment of media content at the requested ABR representation and the scalable stream information to provide transcoding hints for the segment. The re-encoder re-encodes the set of media frames using the transcoding hints to provide an encoded bit stream corresponding to the requested segment of media content.

39 Claims, 5 Drawing Sheets

(51) Int. Cl.
*H04N 21/2343* (2011.01)
*H04N 21/6587* (2011.01)
*H04N 21/845* (2011.01)
*H04N 19/46* (2014.01)
*H04N 19/30* (2014.01)
*H04N 19/146* (2014.01)
*H04N 19/162* (2014.01)
*H04N 19/40* (2014.01)

(56) References Cited

U.S. PATENT DOCUMENTS

| | | | | |
|---|---|---|---|---|
| 6,782,550 | B1* | 8/2004 | Cao | H04N 5/44543 348/E5.105 |
| 6,937,770 | B1* | 8/2005 | Oguz | H04N 19/176 375/240.2 |
| 7,069,573 | B1* | 6/2006 | Brooks | H04N 7/17336 348/E7.073 |
| 7,339,993 | B1* | 3/2008 | Brooks | H04N 21/440263 375/240.1 |
| 7,996,878 | B1* | 8/2011 | Basso | H04N 21/8153 715/723 |
| 8,532,171 | B1* | 9/2013 | Narayanan | H04N 21/8451 375/240.01 |
| 9,380,326 | B1* | 6/2016 | Corley | H04L 29/06482 |
| 9,497,496 | B1* | 11/2016 | Corley | G06Q 30/0261 |
| 9,510,033 | B1* | 11/2016 | Corley | H04N 21/258 |
| 9,591,318 | B2* | 3/2017 | Lu | H04N 19/30 |
| 9,615,098 | B1* | 4/2017 | Yi | H04N 19/134 |
| 9,769,235 | B2* | 9/2017 | Schmidt | H04L 65/607 |
| 9,781,441 | B2* | 10/2017 | Jeong | H04N 19/52 |
| 2001/0047517 | A1* | 11/2001 | Christopoulos | G06T 1/00 725/87 |
| 2002/0157112 | A1* | 10/2002 | Kuhn | H04N 21/234336 725/113 |
| 2003/0041258 | A1* | 2/2003 | Wee | H04N 7/167 713/193 |
| 2003/0118243 | A1* | 6/2003 | Sezer | G06L 9/005 382/245 |
| 2005/0195900 | A1* | 9/2005 | Han | H04N 21/234327 375/240.21 |
| 2007/0157260 | A1* | 7/2007 | Walker | H04N 7/163 725/86 |
| 2009/0193482 | A1* | 7/2009 | White | H04N 7/17318 725/110 |
| 2010/0322302 | A1* | 12/2010 | Rodriguez | H04N 21/631 375/240.01 |
| 2011/0194030 | A1* | 8/2011 | Bae | H04H 20/42 348/723 |
| 2012/0288007 | A1* | 11/2012 | Lee | H04N 19/61 375/240.16 |
| 2013/0263201 | A1* | 10/2013 | Chung-How | H04L 1/0003 725/116 |
| 2014/0019583 | A1* | 1/2014 | Sethuraman | H04L 65/601 709/217 |
| 2014/0064373 | A1* | 3/2014 | Le Leannec | H04N 19/105 375/240.16 |
| 2014/0119451 | A1* | 5/2014 | Sethuraman | H04N 19/39 375/240.16 |
| 2014/0192893 | A1* | 7/2014 | Sullivan | H04N 21/23424 375/240.25 |
| 2014/0282787 | A1* | 9/2014 | Wirick | H04N 19/40 725/115 |
| 2014/0314147 | A1* | 10/2014 | Rusanovskyy | H04N 19/597 375/240.12 |
| 2015/0100994 | A1* | 4/2015 | Phillips | H04N 21/2393 725/93 |
| 2015/0103899 | A1* | 4/2015 | Le Leannec | H04N 19/30 375/240.12 |
| 2015/0186100 | A1* | 7/2015 | Tsai | G06F 3/1454 375/240.12 |
| 2015/0289003 | A1* | 10/2015 | Huber | H04L 65/4076 725/116 |
| 2015/0341657 | A1* | 11/2015 | Onno | H04N 19/70 375/240.16 |
| 2015/0365688 | A1* | 12/2015 | Su | H04N 19/11 375/240.03 |
| 2015/0381690 | A1* | 12/2015 | Schmidt | H04L 65/4069 709/231 |
| 2016/0007050 | A1* | 1/2016 | Rusert | H04N 19/56 375/240.08 |
| 2016/0044080 | A1* | 2/2016 | DuBreuil | H04L 65/4076 709/219 |
| 2016/0156949 | A1* | 6/2016 | Hattori | H04N 21/234345 725/109 |
| 2016/0205164 | A1* | 7/2016 | Schmidt | H04L 1/0001 709/219 |
| 2016/0255355 | A1* | 9/2016 | Andersson | H04N 19/40 375/240.02 |
| 2016/0286249 | A1* | 9/2016 | Phillips | H04N 21/2385 |
| 2016/0308958 | A1* | 10/2016 | Navali | H04N 21/23439 |
| 2017/0041616 | A1* | 2/2017 | Ramamurthy | H04N 19/176 |
| 2017/0093945 | A1* | 3/2017 | Agarwal | H04N 21/64738 |
| 2018/0035140 | A1* | 2/2018 | Li | H04L 65/602 |

* cited by examiner

CONTENT DELIVERY EDGE STORAGE OPTIMIZED MEDIA DELIVERY TO ADAPTIVE BITRATE (ABR) STREAMING CLIENTS

RELATED APPLICATIONS

Benefit is claimed under 35 U.S.C. 119(a)-(d) to Foreign Application Serial No. 201641013318 filed in India entitled "ARCHITECTURE FOR JUST-IN-TIME TRANSCODING OF MEDIA CONTENT", on Apr. 16, 2016, by Ittiam Systems (P) Ltd., which is herein incorporated in its entirety by reference for all purposes.

TECHNICAL FIELD

The present disclosure generally relates to adaptive bit-rate (ABR) streaming of media content, and particularly to content delivery edge storage optimized media delivery to ABR streaming clients.

BACKGROUND

With evolving of streaming media (e.g., video) technologies such as hypertext transfer protocol (HTTP) based adaptive bit-rate (ABR) streaming, users are moving from linear television (TV) content consumption to non-linear, on demand, time-shifted, and place-shifted consumption of content. Example streaming media services may include over-the-top (OTT) delivery of video-on-demand (VOD), subscription VOD (SVOD) services, TV Everywhere (TVE) live-to-VOD services, and cloud digital video recorder (cDVR) services. Streaming media services may use a service provider's own network, a leased network, or a content delivery network (CDN) provider's services to make the content available to a large set of geographically distributed subscribers/users of the service. Streaming media services may tend to cache streams closer to a delivery edge in order to (a) avoid an origin server from getting overloaded, (b) de-congest back-haul networks to improve the end-user quality of experience, and (c) reduce overall cost of delivery.

Further, to handle a diversity of device capabilities, last mile bandwidths, dynamic network conditions, screen resolutions and user preferences, a number of distinct bit streams in an ABR set may tend to be significantly high amounting to a factor of, for instance, 3-4× increase in storage relative to keeping only a highest quality at the highest resolution. In addition, packaging formats, such as HLS (Apple's HTTP live streaming) or MPEG-DASH (ISO's dynamic adaptive streaming over HTTP) profiles, and the cross combinations with content protection schemes that works with end devices may create an additional 2-3× increase in storage requirement if these variants were to be created once and stored for delivery. Also, in case of cDVR, unless a content owner approves, a specific content identified for recording by a given subscriber needs to be kept in a cloud storage in a form that can only be accessible to that subscriber. This is commonly known as "private-copy" mode. In countries with this legal requirement, the storage may need to go in proportion with the number of subscribers who choose to record a program. Further, the subscriber may not even watch the program eventually. Hence, reducing the storage costs may become paramount.

DETAILED DESCRIPTION

Figure 1:
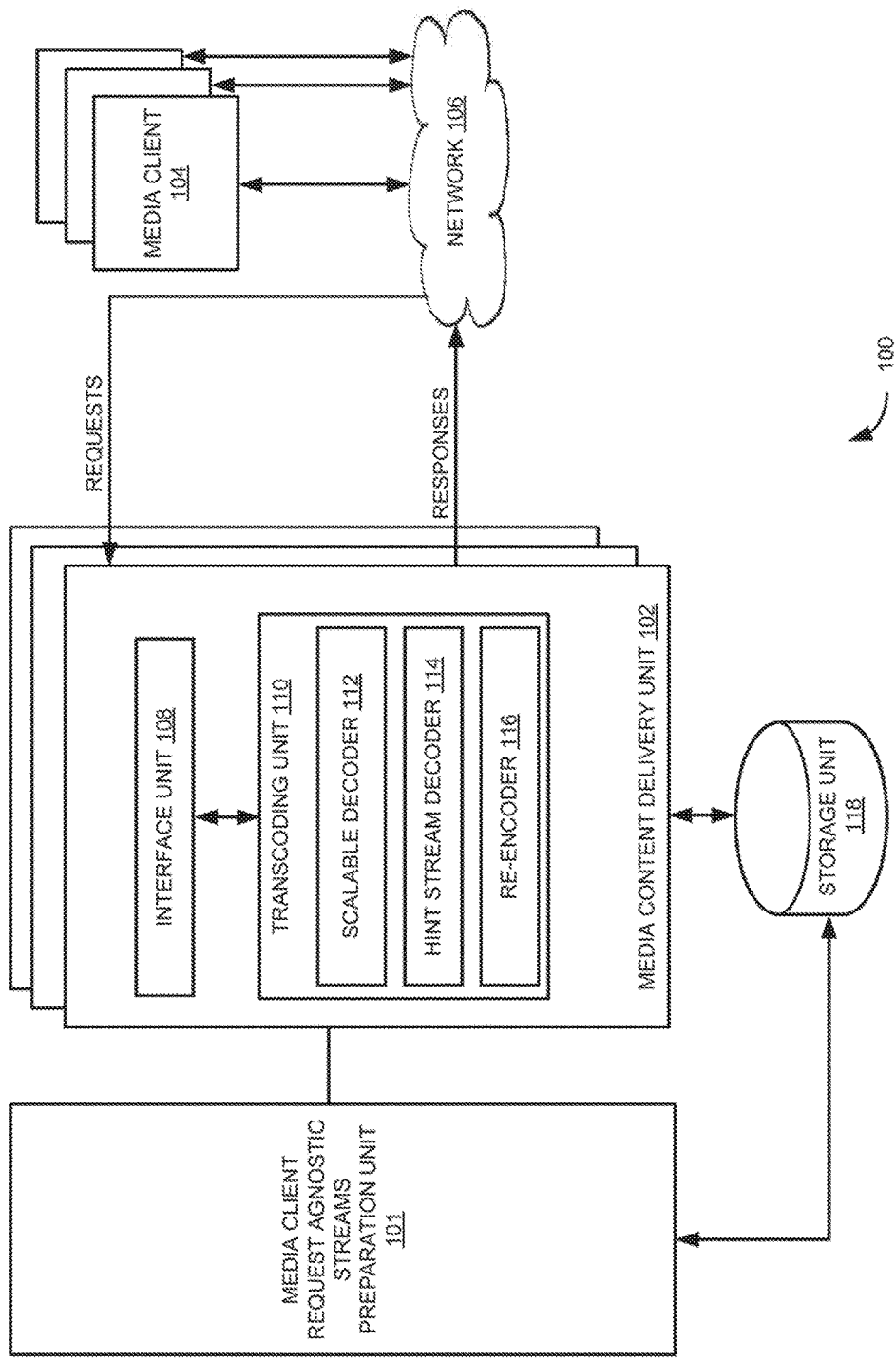
FIG. 1 is an example system, including a system to transcode and provide media content on a segment-by-segment basis for packaging and eventual delivery to a media client.

Just-in-time packaging (JITP) and just-in-time transcoding (JITT) may be employed in streaming media (e.g., video) technologies to reduce storage requirements. In streaming media technologies, compromising on a quality of content delivered over a last mile network constraint can result in customer churn. Hence, the compression efficiency of the just-in-time (JIT) transcoded streams needs to be maintained. Compared to simple schemes that re-use information contained within a single highest resolution and highest bit-rate stream to transcode the stream at additional bit-rates, other existing technologies may recommend guided transcoding where additional streams are sent along with the highest resolution and highest bit-rate stream to assist the JIT transcoder to retain as much quality as possible at a given bit-rate while transcoding the highest resolution and highest bit-rate stream. The following sections describe the scenarios in which the use of the highest resolution and highest bit-rate stream can be sub-optimal from a storage cost or complexity of transcoding points of view.

In the "private-copy" cDVR case, the input can be a broadcast stream that would have been available for recording at home. If the broadcast stream alone can be stored separately for each individual user as compared to storing all the ABR streams, storage cost would have been reduced. But, storing the broadcast stream alone may result in a significantly high JITT cost to generate any needed additional bit-rates on-the-fly at the same or lower resolutions without significantly compromising the quality at those bit-rates. Some existing methods may store the broadcast stream or the highest resolution and highest bit-rate stream and additional guidance streams centrally to allow on-the-fly generation of other streams efficiently when required. In this case, a central server needs to provide the broadcast stream and guidance streams or the JITT stream on-the-fly as and when each user requests a recorded stream. When there is a significant number of concurrent users, this can create choke points on the back-haul network.

Further, caching the content closer to the delivery edge, in advance, may be generally preferable to even out the peak demand. If the broadcast stream is cached at the edge, the storage need tends to be higher for the following reasons.

The broadcast encoders may tend to operate at a lower compression efficiency than internet protocol (IP) mode of delivery due to latency reasons, channel tuning delay constraints, year of deployment, and delivery channel constraints (e.g., constant bit-rate (CBR), or stat-mux variable bit-rate (VBR) over a CBR multiplex). Also, due to legacy set-top box constraints, the broadcast encoding format may have a lower compression efficiency than the newer generation of compression standards or proprietary methods.

To reduce per-subscriber storage needs in the "private-copy" mode of cDVR, longer group of pictures (GOP) and multi-pass VBR encoding with newer advanced compression formats can be used. Compared to taking the broadcast stream for creating such version, the input to the broadcast encoder can be used for preparing such a stream to avoid capturing artifacts in the stream. If only the broadcast stream is available, artifact detection and reduction may be performed before creating the storage optimized format. With advanced elements like content recommendation engines, the most common items that may be watched by a given user can be predicted within a certain time window.

In addition, at-home consumption tends to happen at a set of higher bit-rates within an ABR set, while on-the-go consumption happens at a lower set of bit-rates. While the delivery edge closer to home is predictable, the delivery edge for on-the-go consumption may be harder to predict in advance. In some countries where fair usage policy restricts gigabytes (GBs)/month available at higher download rates under a broadband data plan (where the download baud rate falls to a much lower value above the GB limit) or with multiple users in a house-hold accessing at the same time, users may desire to choose bit-rates of their choice to have control over the data plans. Also, given a certain fixed storage quota per user, users may wish to maximize a number of titles that they can store by trading off resolution or quality. This can be considered analogous to standard-play, long-play, and extended long-play recording modes on analog video cassette recorders that trade off quality to fit more content within a single tape.

It may be possible that future cDVR services may tier their services based on bit-rate ranges that are available to keep the costs proportional to subscription revenue. Furthermore, based on analytics data, it is possible to know a specific set of ABR streams that are typically needed for a specific user. With recent advances in psycho-visual redundancy reduction through pre-processing, encoding, and bandwidth optimizing reencoding techniques, each resolution may be coded differently. For example, due to viewing distance induced averaging, a highest resolution stream may be processed to lose certain details that are not perceivable at typical viewing distances (i.e., relative to the broadcast stream, which is unable to take advantage of this due to the legacy encoder and other constraints mentioned before). Hence, always having the highest quality and highest bit-rate stream cached at the edge and deriving all other streams from that may not be optimal from a storage cost and JIT transcode complexity points of view. While unguided encoding can be several factors more complex than decoding, guided transcoding to achieve a lower resolution can have comparable or lower complexity than higher resolution decoding and high quality downscaling.

In the "shared-copy" cDVR, live-to-VOD TV Everywhere, and OTT or SVOD use cases, the storage needs at a delivery edge are a function of the total number of titles. While a small set of titles are widely watched, a large set of titles are watched by very few, known as the "long-tail" distribution. For a majority of titles falling in a "long-tail", reducing storage costs and incurring only JIT transcoding may be preferable for the set of concurrent users of the service at an edge. If 80% of the titles are long-tail and a factor of 3× savings in storage for these can be achieved through JITT, then the storage savings can be of the order of 50% of the total storage at the edge. Again, with the help of content recommendation engines, predicting a set of titles that are likely to be consumed within a time window across a set of users at a given edge can be possible. Users may desire the ability to select a range of bit-rates of interest in order to manage their broadband plans. Many streaming clients try to stay at the $2^{nd}$ or $3^{rd}$ bit-rate stream from the top to avoid too many stream switches that can be annoying. In many OTT cases, the highest bit-rate stream at a lower resolution tends to be at a higher quality than what can be obtained by downscaling the highest bit-rate stream at the next higher resolution. In the light of the above observations, caching the highest resolution and highest bitrate stream at the delivery edge can be sub-optimal in terms of quality of streams at resolutions lower than the highest resolution and deriving the additional bit-rates from such cached bit stream can be sub-optimal in terms of JIT transcode complexity.

Scalable representations, such as the scalable amendment to H.264/AVC and scalable amendment to H.265/HEVC and other proprietary schemes, have been proposed to exploit redundancy across spatial resolutions or different quality streams at a given resolution to achieve a compression across a range of streams that cover multiple resolutions and multiple quality levels at each resolution. While scalable representations provide an overall storage efficiency, the bit stream size tends to be higher than simulcast coding of a given resolution at a given quality. In other words, over the last mile bandwidth of a customer, the received quality with such representations will be lower than the quality of a simulcast stream coded at the same bit-rate. Hence, rapid adoption of these standards may have been impacted. Rapid adoption of these standards may also have been impacted due to a lack of network elements to adapt as per these standards. Hence, support for these decoders in hardware may not be common. Thus, using such representations for delivery to subscribers may not be practical.

Another aspect with any transcoder is that the quality after transcoding cannot be on par with the quality of the stream at the transcoder input. This is primarily due to the fact that preserving everything in the input requires lossless coding which can require a substantially higher bit-rate than even the input stream bit-rate. In high complexity, hard-to-code scenes, the input stream tends to have certain coding artifacts that may be barely beneath the threshold of visibility. However, re-quantization during transcoding may add further coding noise that can make these artifacts become more visible. Subjective viewing results indicate that the mean opinion scores that users associate with a certain bit stream's decoded video quality is heavily influenced by the artifacts such as blockiness, blurriness, trailing artifacts around moving objects, and the like. Hence, conventional use of JIT transcoding can result in a poor subjective quality impression amongst the users when compared to using adaptive bit-rate streams directly generated from a higher quality input. There are also use-cases where the ABR streams are produced with quality assurance and handed off to CDN providers for delivery. The CDNs look for efficiencies in storage and bandwidth while being able to stay close to the quality of the streams provided.

Just-in-time transcoding may also be employed in STBs for transmission of content to second screens at bit-rates or resolutions suitable for those second screens. Just-in-time transcoding may also be used to cut down on persistent storage of user-generated content as hosted by, for example, iCloud, Dropbox, and Facebook.

Embodiments described herein may provide just-in-time transcoding of media content based on a set of two or more layers of scalable coded representation, hint streams, and quality assurance (QA) hints. Embodiments described herein may combine a bottoms-up scalable coded representation (e.g., for central storage, back-haul network transmission, and edge storage) with a hint-stream driven Just-in-time transcoder/transcoding unit where hint streams are derived, at least, partially from information contained within the scalable coded representation.

In one example, the transcoding unit may include a scalable decoder that receives and decodes a set of two or more layers of a scalable coded representation, corresponding to a requested segment of media content at the requested ABR representation, of the segment to provide a set of media frames and scalable stream information for the segment. The request to obtain a segment of media content at the ABR representation of a plurality of ABR representations may be received from a media client. Further, the transcoding unit may include a hint stream decoder that receives a hint stream, corresponding to the requested segment of media content at the requested ABR representation and the scalable stream information for the segment and decodes the hint stream to provide transcoding hints for the segment. The transcoding unit may include a re-encoder to re-encode the set of media frames using the transcoding hints to provide an encoded bit stream, corresponding to the requested segment of media content at the requested ABR representation, of the segment for packaging and eventual delivery to the media client. Further, a per-segment QA hint based selection unit may determine whether to perform JIT transcoding or not based on QA hints of a corresponding segment for achieving a best trade-off across quality of experience over the user's last mile bandwidth, central and edge storage costs, and the transcoding cost.

In one example, the scalable coded representation may allow transmitting, storing, and decoding the layers of the scalable coded representation that are needed for deriving a specific ABR stream at a specified resolution and bit-rate. Compared to storing the highest resolution and highest quality stream, the scalable coded representation may result in a reduced computational complexity when transcoding to derive lower resolution or lower quality streams and ensure that each resolution is derived in sync with a central down scaler, and allow usage statistics driven caching (e.g., commonly consumed resolution or bit-rate is lower than the highest resolution or bit-rate) that can result in storage savings for both the "private-copy" cDVR and the "shared-copy" use-cases. The bottoms-up scalable coded representation can emphasize lower spatial frequencies to improve a subjective quality of resulting streams. The bottoms-up scalable coded representation can take care of cases where a quality of the highest bit-rate at a lower resolution may not be obtainable by downscaling the highest quality and highest resolution stream.

Examples described herein may provide a high degree of storage savings, first-mile or back-haul network bandwidth savings, and an affordable computational complexity for JIT transcoding to lower the total cost of the service, while minimally compromising on the quality achieved over the user's last mile bandwidth.

Referring to FIG. 1, Fig. is an example system 100, including one or more media content delivery units 102 to transcode and provide media content on a segment-by-segment basis for packaging and eventual delivery to media clients 104. System 100 may include a media client request agnostic streams preparation system 101 and media content delivery unit 102 that is communicatively connected to media client request agnostic streams preparation unit 101. System 100 may include media content delivery unit 102 communicatively connected to media clients 104 over a network 106. Example media client 104 may be a desktop, laptop, notebook, tablet computer, smart phone, PDA, television or other display device having a computer embedded within or attached thereto, or the like. Example media content delivery unit 102 may include one or more servers in content delivery network (CDN). Media clients 104 may be connected to media content delivery unit 102 via network 106 such as WiFi, Ethernet, Bluetooth, radio frequency, coaxial cable, fiber optic, twisted pair, or other internet protocol (IP)-based network infrastructure. Example media content may include audio/video (AV) content such as digital television programs, movies, or generally any multimedia content capable of being delivered over a digital network via one or more AV streams.

Media content delivery unit 102 may include an interface unit 108 and a transcoding unit 110 communicatively coupled to interface unit 108. Media content delivery unit 102 may be associated with a storage unit 118. For example, storage unit 118 may be an internal memory of media content delivery unit 102 or an external storage unit (e.g., a hard disk, a storage card, or a data storage medium) that can be accessible by media content delivery unit 102. Further, transcoding unit 110 may include a scalable decoder 112, a hint stream decoder 114, and a re-encoder 116.

Media client request agnostic streams preparation unit 101 generates a set of layers of the scalable coded representation, hint streams, and QA hints using a subset of which any one of the plurality of ABR representations can be generated. Media client request agnostic streams preparation unit 101 may be a centralized server including components to generate and store input data in storage unit 118. Further, storage unit 118 may be a centralized storage that is communicatively coupled to media client request agnostic streams preparation unit 101 and to the multiple media content delivery units 102. Each media content delivery unit 102 is associated with associated one of the storage units that can cache the streams for delivery.

In operation, interface unit 108 may receive a request to obtain a segment of media content at an ABR representation of a plurality of ABR representations from a media client 104. Upon receiving the request, scalable decoder 112 receives a set of two or more layers of a scalable coded representation corresponding to the requested segment of media content at the requested ABR representation and decodes the set of two or more layers to provide a set of media frames and scalable stream information for the segment. For example, the set of two or more layers may include one or more enhancement layers of the scalable coded representation and a base layer of the scalable coded representation. For example, the ABR representation for providing the segment of the media content may include one or more resolutions (e.g., Ultra High Definition, 1080p, 720p, 480p, and the like), one or more different data rates (e.g., bit-rates) and/or one or more different formats (e.g., picture sizes, frame rates, and the like).

In one example, scalable decoder 112 may decode the set of two or more layers of the scalable coded representation of the segment on-the-fly to generate the pixel values at a given resolution that should be used for JIT transcoding of the segment. In addition, scalable decoder 112 exports the scalable stream information for use by hint stream decoder 114.

Further, hint stream decoder 114 receives a hint stream corresponding to requested segment of media content at the requested ABR representation and the scalable stream information for the segment and decodes the hint stream to provide/reconstruct transcoding hints for the segment. Hint stream decoder 114 may decode the hint stream corresponding to the requested segment of media content at the requested ABR representation of the segment using the scalable stream information from scalable decoder 112. In one example, the transcoding hints for the segment may include information to substantially reduce the complexity of re-encoding the set of media frames within a bit-rate indicated for the requested segment of media content at the requested ABR representation.

Furthermore, re-encoder 116 may re-encode the set of media frames using the transcoding hints to generate (e.g., transcode) an encoded bit stream corresponding to the requested segment of media content at the requested ABR representation for packaging and eventual delivery to media client 104. In one example, re-encoder 116 receives the decoded output (i.e., the set of media frames) of scalable decoder 112 and the decoded transcoding hints and generates an encoded bit stream of a specific coding format at a complexity that is substantially lower than the complexity of a high complexity ABR encoder (e.g., 302 as shown in FIG. 3). The encoded bit stream may be provided for packaging and eventual delivery to media client 104. This is explained in more detail in FIG. 2.

Figure 2:
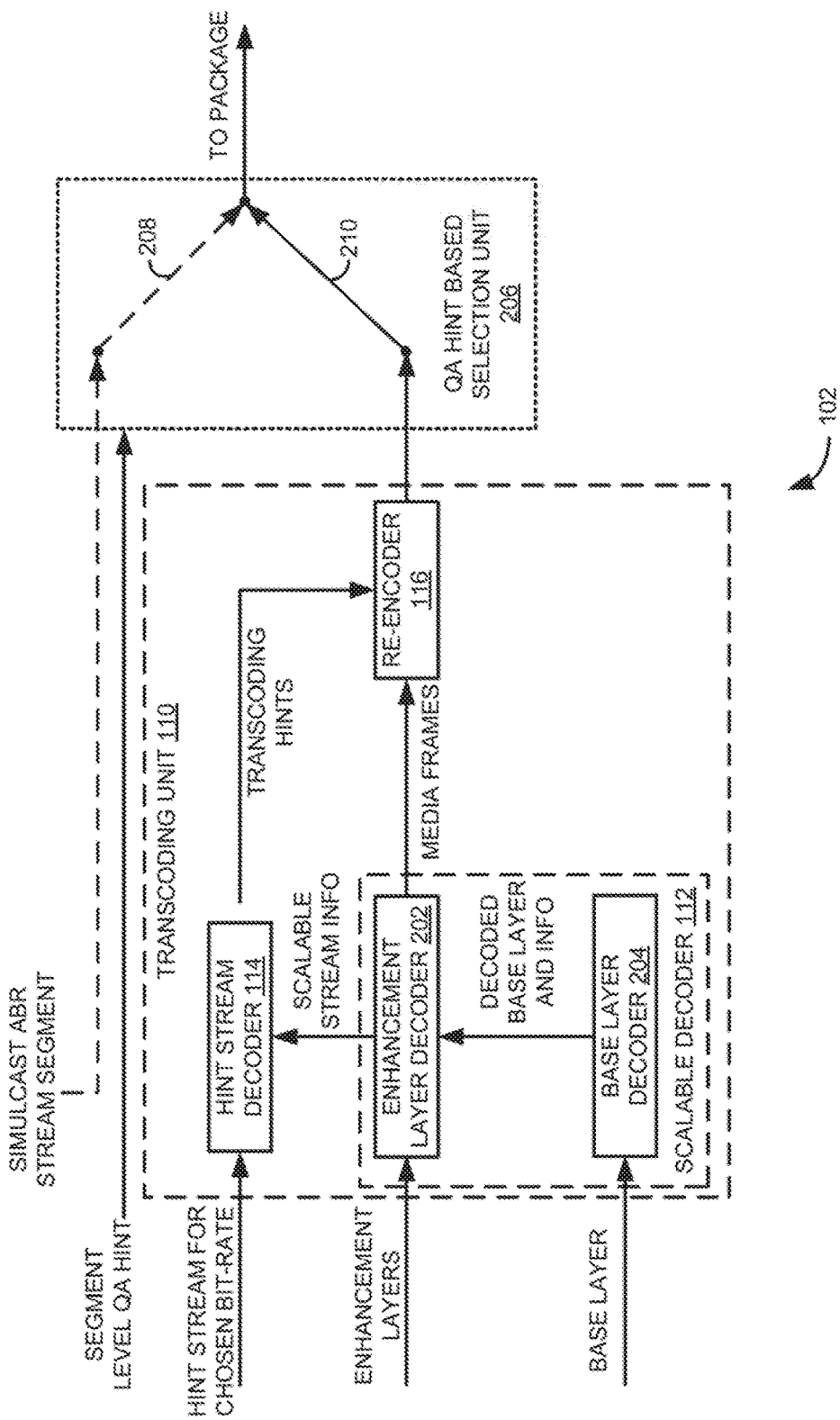
FIG. 2 is an example block diagram of the media content delivery unit illustrating major components to transcode the media content.
Figure 3:
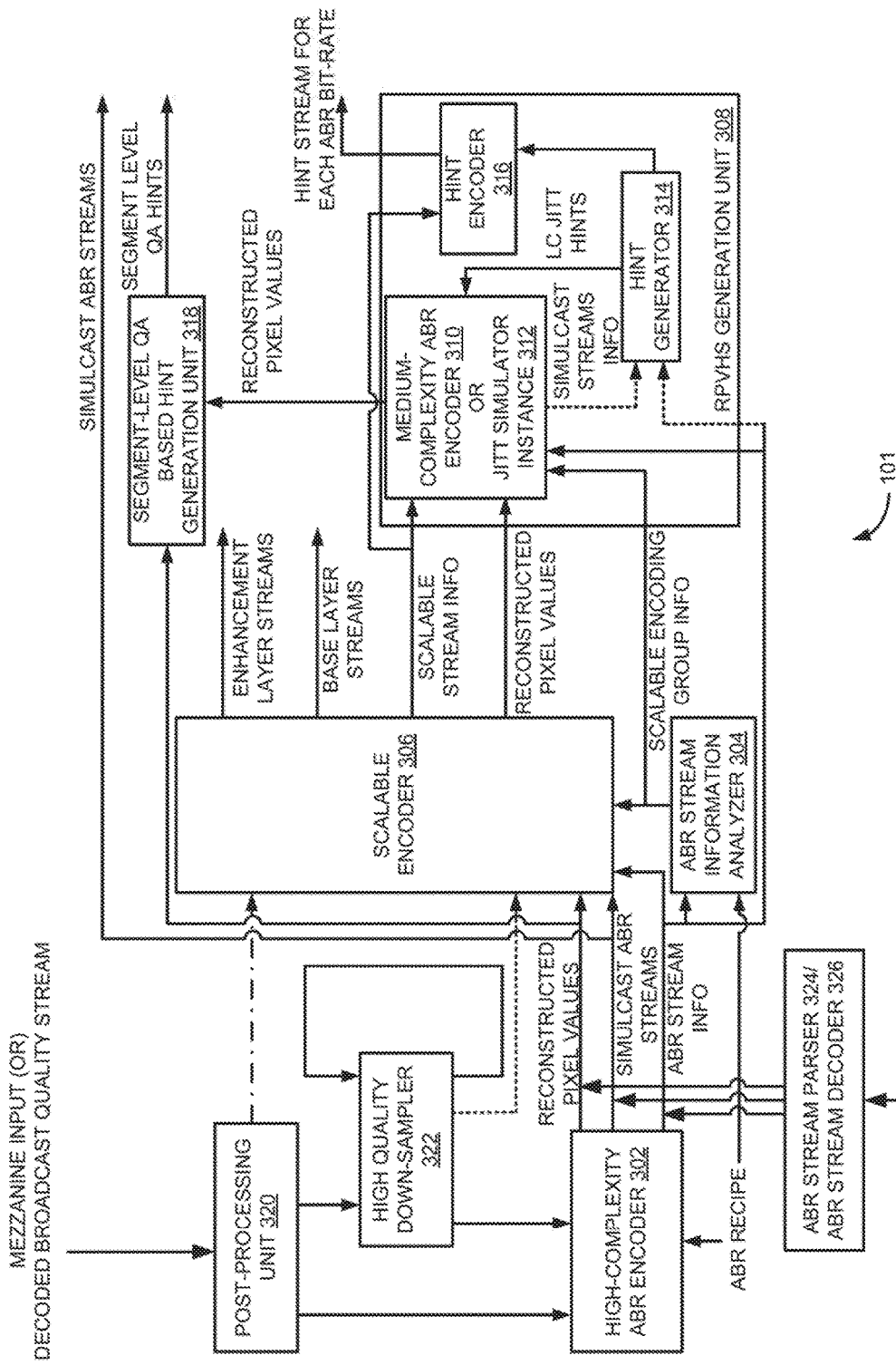
FIG. 3 is an example block diagram of a media client request agnostic streams preparation unit illustrating additional components to generate a set of layers of scalable coded representation, hint streams, and quality assurance (QA) hints for transcoding the media content.

FIG. 2 is an example block diagram of media content delivery unit 102 illustrating major components to transcode the media content. Particularly, FIG. 2 illustrates an example architecture for just-in-time transcoding unit 110 of media content delivery unit 102. As shown in FIG. 2, media content delivery unit 102 includes transcoding unit 110 and a QA hint based selection unit 206 operatively coupled to transcoding unit 110. Further, scalable decoder 112 includes an enhancement layer decoder 202 and a base layer decoder 204.

In operation, upon receiving the request to obtain the segment of media content at the ABR representation, QA hint based selection unit 206 receives a QA hint corresponding to the requested segment of media content at the requested ABR representation of the segment and conditionally schedules transcoding unit 110 to generate the encoded bit stream of the segment.

In one example, when the QA hint indicates that transcoding of the segment results in the quality less than the reference quality, QA hint based selection unit 206 conditionally obtains a pre-packaged or unpackaged simulcast ABR stream corresponding to the requested segment of media content at the requested ABR representation (e.g., by either requesting it from a central storage using its URL or from a locally cached storage unit) for further packaging and eventual delivery to the media client 104.

In another example, when the QA hint indicates that transcoding of the segment results in a quality greater than or equal to a reference quality, transcoding unit 110 is triggered to generate the encoded bit stream as follows. Scalable decoder 112 may decode the set of two or more layers of the scalable coded representation, corresponding to the requested segment of media content at the requested ABR representation, of the segment to provide the set of media frames and scalable stream information for the segment.

In one example, base layer decoder 204 may decode a base layer of the scalable coded representation and enhancement layer decoder 202 may decode one or more enhancement layers of the scalable coded representation using the decoded base layer and associated information to provide the set of media frames. Further, hint stream decoder 114 may decode the hint stream, corresponding to the requested ABR segment of media content at the requested representation, of the segment to provide transcoding hints for the segment. Re-encoder 116 may re-encode the set of media frames using the transcoding hints to provide the encoded bit stream, corresponding to the requested segment of media content at the requested ABR representation, of the segment.

In one example operation, interface unit 108 may receive a desired bit-rate on a segment by segment basis. QA hint based selection unit 206 may fetch a QA hint for a given segment and the desired bit-rate. If the QA hint indicates that transcoding of the given segment degrades quality, then QA hint based selection unit 206 may fetch a simulcast stream corresponding to the desired bitrate and pass the simulcast stream to the packager for packaging and eventual delivery (e.g., as shown by 208).

If the QA hint indicates that the quality degradation with transcoding of the given segment is acceptable, then QA hint based selection unit 206 may trigger transcoding unit 110 to fetch appropriate layers of a scalable coded representation and hint stream both corresponding to the desired bit-rate, decode the fetched layers of the scalable coded representation using scalable decoder 112, decode the hint stream using hint stream decoder 114 while using the scalable stream information exported by scalable decoder 112 during the process of such decoding, and perform a re-encoding of the decoded pixel values (i.e., media frames) at a low complexity by re-encoder 116 using the transcoding hints from hint stream decoder 114. Further, QA hint based selection unit 206 may fetch re-encoded pixel values corresponding to the desired bitrate and pass the re-encoded pixel values to the packager for packaging and eventual delivery (e.g., as shown by 210).

For example, the storage requirements for the scalable streams, hint streams, and QA hint stream together are substantially lower than the storage requirements for the simulcast ABR streams over a large majority of the media segments. Also, the first mile bandwidth to fetch the scalable streams, hint streams, and QA hint streams that are prepared by the media request agnostic content preparation unit 101 to a media content delivery unit 102 is substantially lower than the bandwidth to fetch the simulcast ABR streams over a large majority of the media segments. An example architecture for generating the set of layers of scalable coded representation, hint streams, and quality assurance (QA) hints used during transcoding of the media content is explained in detail in FIG. 3.

FIG. 3 is an example block diagram of media client request agnostic streams preparation unit 101 illustrating additional components to generate the set of layers of scalable coded representation, the hint streams, and the quality assurance (QA) hints that are used during transcoding of the media content. Particularly, FIG. 3 illustrates an example architecture for, centrally or in a distributed manner, generating the set of layers of scalable coded representation, hint streams for JIT transcoding, and QA hints on a segment-by-segment basis to facilitate the low complexity JIT transcoding architecture while minimally compromising the quality seen over the last-mile bandwidth.

As shown in FIG. 3, media client request agnostic streams preparation unit 101 includes a high-complexity ABR encoder 302, an ABR stream information analyzer 304, a scalable encoder 306, a reconstructed pixel values and hint stream (RPVHS) generation unit 308, a medium-complexity ABR encoder 310 or a JITT simulator instance 312, a hint generator 314, a hint encoder 316, a segment-level QA based hint generation unit 318, a post-processing unit 320, and a high quality down-sampler 322, that are communicatively coupled to each other.

During operation, a high-quality input stream is decompressed if the high-quality input stream is in a compressed format to obtain frames at a specific input frame-rate and spatial resolution. Optionally, post-processing unit 320 may post-process the frames to remove any compression artifacts or to enhance video quality. Depending on ABR recipe, high quality down-sampler 322 may produce necessary lower resolution streams of the input stream. In one example, the lower resolution streams may be passed to high-complexity ABR encoder 302. If the input stream is in an uncompressed format or if the input stream is in a compressed format that is not directly suitable as an ABR stream for use within the ABR recipe, the highest resolution stream is also passed to high complexity ABR encoder 302.

In operation, high-complexity ABR encoder 302 generates, from a mezzanine input stream, the set of simulcast ABR streams, reconstructed pixel values for the set of simulcast ABR streams, and ABR stream information for the set of simulcast ABR streams according to an ABR recipe. The set of simulcast ABR streams is generated at a first computational complexity level. In one example, high-complexity ABR encoder 302 may generate the set of simulcast ABR streams according to an ABR streams generation recipe. The set of layers of the scalable coded representation, the hint streams, and the QA hint streams are generated such that a total storage requirements or first mile bandwidth requirements of the set of layers of the scalable coded representation, the hint streams, and the QA hint streams are substantially less than the storage requirements or first mile bandwidth requirements for the simulcast ABR streams.

For example, ABR recipe may include at least one parameter selected from a group consisting of a coding format, a bit-rate switchable segment duration, an intra picture period, a number of temporal layers, a distance between two consecutive temporal base layer pictures, a spatial resolution, a frame-rate, a coded picture buffer size, a maximum instantaneous bit-rate, a bit-rate, and a ratio of bit-rates with respect to a bit-rate of a reference stream for each simulcast ABR stream in the set of simulcast ABR streams.

The input at each resolution is derived typically from the highest quality and highest resolution input (e.g., a mezzanine format decoder output or a broadcast quality stream decoder output). The complexity of high-complexity ABR encoder 302 may tend to be high as implementations evaluate a large set of coding parameter combinations at the coding tree block level using a cost function that involves both rate and distortion and select the coding parameter combination with least cost. In addition to producing the simulcast ABR stream corresponding to each segment of the media content, high-complexity ABR encoder 302 also exports the reconstructed pixel values of each simulcast ABR stream and the ABR stream information.

For example, the ABR stream information may include picture level information and coding tree block level information. Example picture level information may include information selected from a group consisting of a picture type, reference pictures, scaling matrices for intra/inter and luma/chroma, and deblocking filter offset parameters. Example coding tree block level information may include information selected from a group consisting of a partitioning information for prediction, a type of prediction information for each prediction partition, a specific prediction mode within the type of prediction for each prediction partition, motion vectors with respect to specific reference pictures for each prediction partition, partitioning information for transform coding, and scalar or vector quantizer information at the transform partition level.

At the coding tree block level, a top set of coding parameters encountered in the sense of a cost function can also be maintained along with a winning set of coding parameters. In some cases, a set of simulcast ABR streams may be made available with or without access to the highest quality and highest resolution input. In such cases, an ABR stream parser 324 may be used to parse the set of simulcast ABR streams to generate the ABR stream information. If the highest quality and highest resolution input is not available, then an ABR stream decoder 326 may be used to decode the set of simulcast ABR streams to produce the reconstructed pixel values of each simulcast ABR stream at each bit-rate.

Further, ABR stream information analyzer 304 may determine one or more groups of bit-rates that can be encoded with dependency through scalable encoding based on the ABR stream information from high-complexity ABR encoder 302 and the ABR recipe. For each group of bit-rates, a lowest bit-rate in a corresponding group of bit-rates is a base bit-rate for the scalable coded representation. In one example, given the ABR recipe and the ABR stream information, ABR stream information analyzer 304 determines appropriate groups of bit-rates that can be coded with dependency through scalable encoding. For example, even though the recipe may require coding at 240p, 360p, 480p, 720p, and 1080p, ABR stream information analyzer 304 can group 240p, 360p, and 480p as one group and 720p and 1080p as another group. Even within a given resolution, the bit-rates can belong to more than one group. Such decision can be based on the sweet spot bit-rates used by users at home vs. the sweet spot bit-rates used by users on-the-go so that those sweet spot bit-rates can use the simulcast ABR stream produced by high complexity ABR encoder 302 with no further quality degradation due to any transcoding operation. ABR stream information analyzer 304 also decides a suitable number of enhancement layers for a scalable representation. The number of enhancement layers need not be equal to one less than the number of bit-rates in a group. Such decision can be made based on the storage increase/reduction incurred by combining multiple bit-rates under one enhancement stream, and complexity addition/reduction during transcoding with a single enhancement stream as compared to multiple enhancement streams.

Furthermore, scalable encoder 306 may generate a set of layers (i.e., one or more enhancement layers and a base layer) of a scalable coded representation for each group of bit-rates by performing spatial scalable, SNR, and temporal scalable coding of the mezzanine input (or high-quality input) at different resolutions or the reconstructed pixel values of the set of simulcast ABR streams corresponding to each group of bit-rates. In one example, scalable decoder 112 may fetch and decode the set of two or more layers of the segment from the set of layers corresponding to each group of bit-rates, for example, via storage unit 118. In addition, scalable encoder 306 may export reconstructed pixel values and scalable stream information corresponding to the set of layers of the scalable coded representation for each group of bit-rates. In one example, the set of layers of the scalable coded representation for each group of bit-rates is stored in a centralized storage unit (e.g., 118) for accessing by one or more media content delivery systems 102. The base layer of the scalable coded representation for a group of bit-rates is a simulcast ABR stream within the set of simulcast ABR streams that corresponds to the lowest bit-rate within the group of bit-rates, and the one or more enhancement layers of the scalable coded representation may include simulcast ABR streams corresponding to remaining bit-rates in each group of bit-rates. For example, the simulcast ABR stream corresponding to the base bit-rate can be used as the base layer so that no further transcoding induced quality loss is incurred for the corresponding bit-rate.

For example, scalable encoder 306 may generate a bottoms-up scalable coded representation for each group of bit-rates based on a determined dependency order and the ABR stream properties. The scalable coded representation may be stored centrally, delivered in whole or in parts over the back-haul network to the edge, and stored at the edge on receipt (e.g., another node in the cloud for storage and eventual use for Just-in-time transcoding). The scalable representation can be generated either from a higher quality mezzanine input (or) from the set of ABR streams. The base layer of such a scalable coded representation can be an ABR simulcast stream (i.e., corresponding to the resolution and quality of the independent layer in each group of bit-rates) so that the bit-rate undergoes no additional quality degradation due to transcoding. In addition to producing the layers of scalable coded representation (i.e., scalable bit stream layers), scalable encoder 306 also exports the reconstructed pixel values of specific layers to obviate decoding and also exports scalable stream information that contains the coding parameters at the picture and coding tree block level for use by downstream modules/components to reduce their complexity or to use as predictors in a coding representation to reduce the bit-rate for transmitting hint streams. The complexity of scalable encoding can be reduced by using the ABR stream information for the corresponding group of bit-rates. When encoding from the mezzanine quality input, the highest quality of the scalable stream for a given group of bit-rates can be higher than the quality of the highest bit-rate in that group of bit-rates. This is to compensate for some quality loss due to transcoding. In one example, one scalable encoder is used per group of bit-rates.

RPVHS generation unit 308 may generate reconstructed pixel values for each ABR representation and hint stream for each ABR representation based on the reconstructed pixel values and the scalable stream information from scalable encoder 306 and the ABR stream information from high-complexity ABR encoder 302. RPVHS generation unit 308 may include medium-complexity ABR encoder 310 or JIT transcoder (JITT) simulator instance 312, hint generator 314, and hint encoder 316. For example, the set of ABR representations prepared for providing the segment of the media content may include one or more resolutions, one or more different data rates (e.g., bit-rates) and/or one or more different formats (e.g., picture sizes, frame rates, and the like).

Medium complexity ABR encoder 310 may generate a set of ABR streams conforming to the ABR recipe starting from the reconstructed pixel values of specific layers provided by scalable encoder 306. The complexity of medium complexity ABR encoder 310 is lowered compared to high complexity ABR encoder 302 using the ABR stream information exported by high complexity ABR encoder 302 (or the ABR stream decoder mentioned earlier). In addition, the medium complexity ABR encoder 310 exports simulcast stream information corresponding to the set of ABR streams and the reconstructed pixel values at each bit-rate.

Hint generator 314 derives a set of transcoding hints, one set per bit-rate in the ABR set of bit-rates, which when used may allow a significantly lower complexity JIT transcoding from the scalable coded representation (i.e., available in whole or in parts) to achieve a quality at the specified bit-rate that is substantially close to what can be possible with a significantly higher complexity transcoder at the same bit-rate. In one embodiment, hint generator 314 takes the simulcast stream information coming from medium complexity ABR encoder 310 for deriving the transcoding hints for each bit-rate. In another example embodiment, hint generator 314 takes the ABR stream information coming from high complexity ABR encoder 302 for deriving the transcoding hints for each bit-rate.

JITT simulator instance 312 may act as a Just-in-time transcoding simulator that takes the reconstructed pixel values of specific layers provided by scalable encoder 306 and the transcoding hints provided by hint generator 314 to generate reconstructed pixel values that are identical when the transcoded streams are decoded.

Hint encoder 316 may encode the derived set of transcoding hints for each bit-rate into a coded bit stream (i.e., hint stream) where such coding exploits the information available from the scalable coded representation to reduce the size of the coded hint bit stream. The hint bit streams can be stored centrally, delivered over the back-haul network to the edge based on the bit-rate required, and stored at the edge on receipt. The encoding of hint streams can be done in a lossless manner.

In one example implementation, RPVHS generation unit 308 may include medium-complexity ABR encoder 310, hint generator 314, and hint encoder 316. In this case, medium-complexity ABR encoder 310 generates a set of ABR streams at a second computational complexity level, simulcast stream information for the set of ABR streams, and reconstructed pixel values for each ABR representation by taking the reconstructed pixel values and the scalable stream information of the set of layers from scalable encoder 306 and the ABR stream information from high-complexity ABR encoder 302. The second computational complexity level is significantly less than the first computational complexity level. Second complexity level may include a reduced set of coding parameter combinations to create the set of ABR streams. Hint generator 314 generates transcoding hints corresponding to each ABR representation (e.g., bit-rate) based on the simulcast stream information received from medium-complexity ABR encoder 310. Hint encoder 316 encodes the transcoding hints corresponding to each ABR representation (e.g., bit-rate) to provide the hint stream corresponding to each ABR representation. In one example, hint encoder 316 encodes the transcoding hints corresponding to each ABR representation using the scalable stream information from scalable encoder 310 to provide the hint stream corresponding to each ABR representation.

In another example implementation, RPVHS generation unit 308 may include hint generator 314, JITT simulator instance 312, and hint encoder 316. In this case, hint generator 314 generates transcoding hints corresponding to each ABR representation based on the ABR stream information received from high-complexity ABR encoder 302. JITT simulator instance 312 receives, for each ABR representation, the corresponding generated transcoding hints, encode the reconstructed pixels values of the corresponding set of layers from the scalable encoder using the generated transcoding hints, and generate the reconstructed pixel values for each ABR representation (e.g., bit-rate). Further, hint encoder 316 encodes the transcoding hints corresponding to each ABR representation to provide the hint stream corresponding to each ABR representation. Hint encoder 316 encodes the transcoding hints corresponding to each ABR representation using the scalable stream information from scalable encoder 306.

Segment-level QA based hint generation unit 318 may generate QA hints for a plurality of segments of the media content at each ABR representation by comparing the reconstructed pixel values from high-complexity ABR encoder 302 and the reconstructed pixel values from RPVHS generation unit 308. In one example implementation, segment-level QA based hint generation unit 318 computes the difference between the reconstructed pixel values of medium complexity ABR encoder 310 or JITT simulator instance 312 at a given bit-rate and the corresponding reconstructed pixel values of high complexity ABR stream encoder 302's output at that bit-rate on a segment by segment basis using a cost function (e.g., mean squared error, peak signal to noise ratio (PSNR), structure similarity metric, human visual system weighted PSNR, just-noticeable distortion, and the like) and thresholds the cost function to determine a QA hint for a given segment in terms of whether the segment should be JIT transcoded from the layers of scalable coded representation (i.e., when the difference is less than or equal to the threshold) or should use the simulcast ABR stream from high complexity ABR encoder 302 (i.e., when the difference is greater than the threshold). When the QA hint indicates JIT transcoded segment, the media content delivery unit 102 (e.g., media delivery edge server) appropriately schedules the JIT transcoding of this segment at the requested bit-rate and resolution and sends the transcoded segment to the packager and for eventual delivery in whole or in parts. When the QA hint indicates use of the simulcast ABR stream from the high complexity ABR encoder 302, the media content delivery unit 102 checks a local cache to see whether this segment is already cached locally. If not, media content delivery unit 102 causes this segment to be fetched using a uniform resource locator (URL) associated with the segment. If this segment is already packaged in the required format, then the segment can be delivered to the media client. Else, it will be re-packaged in packager to the required format and then will be delivered to the media client in whole or in parts.

The difference metric for a segment can be computed as a weighted average over all pixels in the segment or only over a set of pixels in the segment that have a deviation that exceeds a pre-determined threshold. In other example implementations, segment-level QA based hint generation unit 318 can receive the pixels from the mezzanine format input and associated downscaled versions rather than from high complexity ABR encoder 302. While the scalable coded representation and the hint stream are generated using independent modules as shown in FIG. 3, a single module can jointly code the scalable coded representation and the hint stream in a joint rate-distortion optimal method.

The example architectures of FIGS. 2 and 3 can run on a same server or on different servers. The preferred embodiment is for the high complexity ABR streams, scalable streams, ABR hint streams, medium complexity ABR streams and ABR QA hint streams to be generated once and used in the delivery to multiple media clients through geographically distributed media content delivery units 102 (e.g., media delivery edge servers). The example architectures can be realized through dedicated hardware or through software or a combination of both. Different segments of a given input can be processed in a distributed manner on different compute nodes. The outputs of FIG. 2 such as, the scalable coded representation layers, hint streams, QA hints, and ABR simulcast streams can be prepared in advance and stored or generated on-demand. Similarly, the outputs in FIG. 1 can be generated in advance and stored or generated on-demand.

The scalable coded representation can use any current scalable coding standard such as SVC or SHVC or can be a purely proprietary representation. The formats of the scalable coded representation and the simulcast ABR streams for delivery can be different, thereby allowing for an improved technology over the delivery format's technology to be employed to achieve additional storage and bandwidth cost reduction.

In the "private-copy" mode of cDVR, based on legal provisions, only an appropriate part of the scalable coded representation needs to be stored separately for each subscriber. For instance, only the base layers can be stored separately while only a single copy of the enhancement layer can be shared across the subscribers. Similarly, a shared copy of the hint streams and QA hints can be used.

It should be noted that the number of bit-rates within a group of bit-rates determined by the ABR stream Information analyzer 304 need not result in as many layers within the corresponding scalable coded representation. For example, it is possible to have 3 layers in the scalable coded representation when the number of bit-rates in a group is 5.

Though frame-rate is not explicitly called out, it is implicitly assumed that each ABR stream has a frame-rate property in addition to resolution, bit-rate, and coding format. This frame-rate is maintained through scalable encoder 306 and transcoding unit 110.

In some cases, the roles of high complexity ABR encoder 302 and medium complexity ABR encoder 310 can be swapped. Specifically, swapping can be useful to avoid unconditional generation of simulcast stream for all segments. In such cases, high complexity ABR encoder 302 may take the reconstructed pixel values of the scalable coded representation to produce the hint streams and the reconstructed pixel values of transcoding unit 110 and medium complexity ABR encoder 310 may use coding parameter set combinations exported by high complexity ABR encoder 302 for coding the simulcast stream segment derived from the high-quality input when the QA hint computed suggests simulcast stream's need for a given segment.

The derivation of the hint stream from the ABR stream information can be by retaining the entire set of coding parameters at the picture and coding tree block level for each bit-rate or by retaining only a subset of these coding parameters. When the entire set of coding parameters are retained, the complexity of JIT re-encoding can be at its lowest. In such cases, a hardware or software module that takes the entire set of coding parameters and performs normative encoding according to a specified coding format can be used. It should be noted that the hint streams may not contain any information at the transform coefficients level in order to reduce the size of the hint streams. Hence, operations, such as trellis coded or rate-distortion optimal quantization hints can be performed by re-encoder 116 which can cause the quality and bit-rate of the transcoded stream to be different from what was assessed at the time of QA hints generation.

It should be understood that segment-level QA based hint generation unit 318 can be employed even without a scalable representation or hint streams. For example, segment-level QA based hint generation unit 318 can be employed with an unguided JIT transcoding from the highest resolution and highest quality stream. Similarly, the combination of a scalable representation and hint streams for JIT transcoding can be used with or without segment-level QA based hint generation unit 318.

In one example, the components of media content delivery system 102 and media client request agnostic streams preparation unit 101, as shown in FIGS. 1-3, may be implemented in hardware, machine-readable instructions or a combination thereof. In one example, each of the components of media client request agnostic streams preparation unit 101 and media content delivery system 102 may be implemented as engines or modules comprising any combination of hardware and programming to implement the functionalities described herein. The functionality of the components of each of media client request agnostic streams preparation unit 101 and media content delivery system 102 may be implemented in electronic devices such as personal computers (PCs), server computers, tablet computers, mobile devices and the like.

Each of media content delivery system 102 and media client request agnostic streams preparation unit 101 may include computer-readable storage medium comprising (e.g., encoded with) instructions executable by a corresponding processor to implement functionalities described herein in relation to FIGS. 1-3. The functions of components of each of media client request agnostic streams preparation unit 101 and media content delivery system 102 may also be implemented by a corresponding processor. In examples described herein, the processor may include, for example, one processor or multiple processors included in a single device or distributed across multiple devices.

Figure 4:
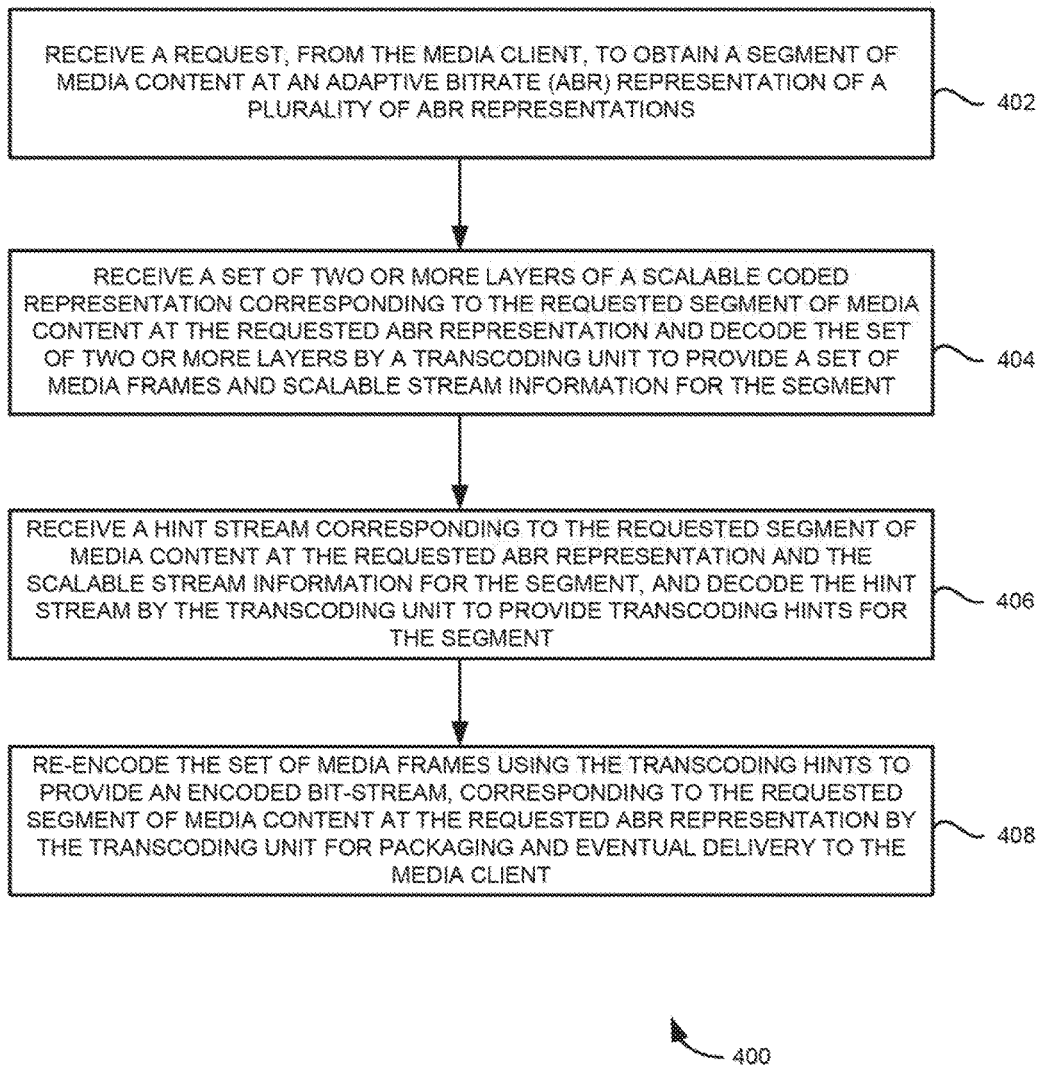
FIG. 4 illustrates an example flow chart of a method for providing ABR streaming of media content on a segment-by-segment basis to a media client.

FIG. 4 illustrates an example flow chart 400 of a method for providing ABR streaming of media content on a segment-by-segment basis to a media client. It should be understood the process depicted in FIGS. 9A and 9B represent generalized illustrations, and that other processes may be added or existing processes may be removed, modified, or rearranged without departing from the scope and spirit of the present application. In addition, it should be understood that the processes may represent instructions stored on a computer readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design or fabricate circuits, generate machine-readable instructions, or use a combination of hardware and machine-readable instructions to perform the illustrated processes.

At 402, a request to obtain a segment of the media content at an ABR representation of a plurality of ABR representations may be received from the media client. A QA hint corresponding to the requested segment of media content at the requested ABR representation of the segment may be received. When the QA hint indicates that transcoding of the segment results in the quality less than the reference quality, a pre-packaged or unpackaged simulcast ABR stream corresponding to the requested segment of media content at the requested ABR representation may be conditionally obtained for further packaging and eventual delivery to the media client.

When the QA hint indicates that transcoding of the segment results in a quality greater than or equal to a reference quality, the transcoding unit is conditionally scheduled to generate the encoded bit stream of the segment for packaging and eventual delivery to the media client as shown in steps 404 to 408.

At 404, a set of two or more layers of a scalable coded representation corresponding to the requested segment of media content at the requested ABR representation may be received by a transcoding unit. Further at 404, the set of two or more layers may be decoded by the transcoding unit to provide a set of media frames and scalable stream information for the segment. In one example, the set of layers may include at least one enhancement layer of the scalable coded representation and a base layer of the scalable coded representation.

At 406, a hint stream corresponding to the requested segment of media content at the requested ABR representation and the scalable stream information for the segment may be received by the transcoding unit. Further at 406, the hint stream may be decoded by the transcoding unit to provide transcoding hints for the segment. For example, the transcoding hints for the segment comprises information to substantially reduce the complexity of re-encoding the set of media frames within a bit-rate indicated for the requested segment of media content at the requested ABR representation. In one example, the hint stream, corresponding to the requested segment of media content at the requested ABR representation, of the segment may be decoded using the scalable stream information to provide the transcoding hints for the segment.

At 408, the set of media frames may be re-encoded using the transcoding hints to provide an encoded bit stream, corresponding to the requested segment of media content at the requested ABR representation by the transcoding unit for packaging and eventual delivery to the media client.

In one example, set of layers of scalable coded representation, hint streams, and quality assurance (QA) hints for each ABR representation can be generated as follows. The set of simulcast ABR streams, reconstructed pixel values for the set of simulcast ABR streams, and ABR stream information for the set of simulcast ABR streams are generated by a high-complexity ABR encoder according to an ABR recipe from a mezzanine input stream. The set of simulcast ABR streams may be generated at a first computational complexity level.

Further, one or more groups of bit-rates that can be encoded with dependency through scalable encoding can be determined by an ABR stream information analyzer based on the ABR stream information from the high-complexity ABR encoder and the ABR recipe. In one example, a lowest bit-rate in each group of bit-rates is a base bit-rate for the scalable coded representation.

Furthermore, a set of layers of a scalable coded representation may be generated for each group of bit-rates based on the mezzanine input at different resolutions or the reconstructed pixel values of the simulcast ABR streams corresponding to each group of bit-rates by a scalable encoder. In one example, the set of layers of the scalable coded representation corresponding to the requested segment of media content at the requested ABR representation of the segment is fetched from the set of layers corresponding to each group of bit-rates. Also, reconstructed pixel values and scalable stream information corresponding to the set of layers of the scalable coded representation for each group of bit-rates may be exported to an RPVHS generation unit by the scalable encoder. For example, the set of layers corresponding to each group of bit-rates may be stored in a centralized storage unit for accessing by one or more transcoding units.

Also, reconstructed pixel values for each ABR representation and hint stream for each ABR representation may be generated by the RPVHS generation unit based on the reconstructed pixel values and the scalable stream information from the scalable encoder, and the ABR stream information from the high-complexity ABR encoder. In addition, QA hints may be generated for a plurality of segments of the media content at each ABR representation by a segment-level QA based hint generation unit by comparing the reconstructed pixel values from the high-complexity ABR encoder and the reconstructed pixel values from the RPVHS generation unit.

Figure 5:
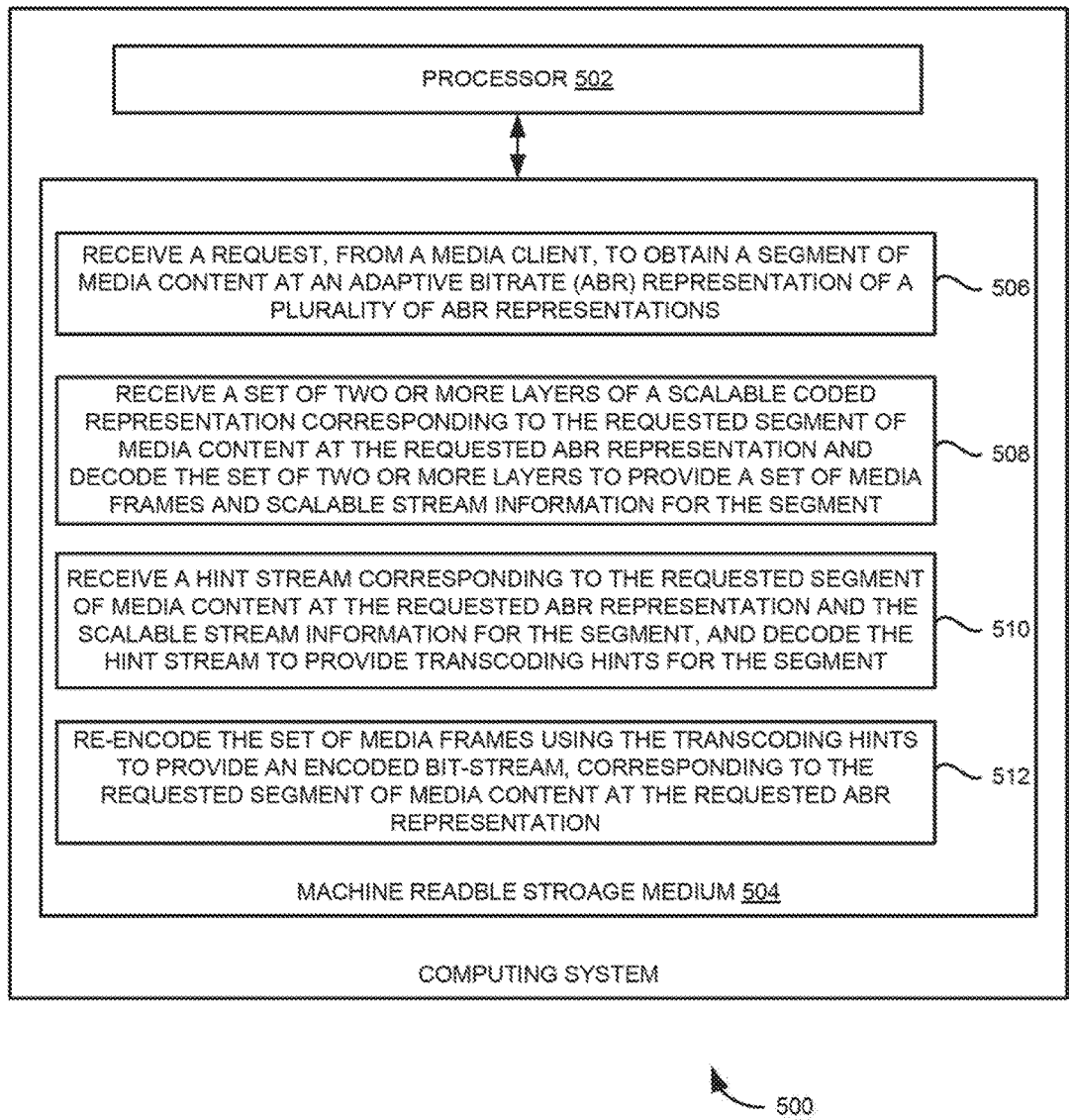
FIG. 5 illustrates a block diagram of an example computing device to provide ABR streaming of media content on a segment-by-segment basis to a media client.

FIG. 5 illustrates a block diagram of an example computing device 500 to transcode media content on a segment-by-segment basis based on a set of layers of scalable coded representation, hint streams, and QA hints. Example computing device may include a transmitting device or a recipient device in the group chat. Computing device 500 may include processor 502 and a machine-readable storage medium/memory 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing device 500.

Machine-readable storage medium 504 may store instructions 506-512. In an example, instructions 506-512 may be executed by processor 502 to provide a contextual content sharing in a group conversation medium. The group conversation medium may be a synchronous conversation medium, asynchronous conversation medium or a combination thereof. The asynchronous conversation medium is a medium in which an interaction is performed without requiring other users of the electronic devices to be online, and the synchronous conversation medium is a medium in which an interaction is performed between the online and active users.

Instructions 506 may be executed by processor 502 to receive a request, from a media client, to obtain a segment of media content at an adaptive bitrate (ABR) representation of a plurality of ABR representations. Instructions 508 may be executed by processor 502 to receive a set of two or more layers of a scalable coded representation corresponding to the requested segment of media content at the requested ABR representation and decode the set of two or more layers by a transcoding unit to provide a set of media frames and scalable stream information for the segment. Instructions 510 may be executed by processor 502 to receive a hint stream corresponding to the requested segment of media content at the requested ABR representation and the scalable stream information for the segment, and decode the hint stream by the transcoding unit to provide transcoding hints for the segment.

Instructions 512 may be executed by processor 502 to re-encode the set of media frames using the transcoding hints to provide an encoded bit stream, corresponding to the requested segment of media content at the requested ABR representation, of the segment by the transcoding unit for packaging and eventual delivery to the media client.

In one example, simulcast ABR streams and reconstructed pixel values of the simulcast ABR streams are generated by a high-complexity ABR encoder according to an ABR recipe from a mezzanine input stream. Further, the set of layers of a scalable coded representation is generated by a scalable encoder based on the mezzanine input at different resolutions or the reconstructed pixel values of the simulcast ABR stream. Further, the hint stream and reconstructed pixel values corresponding to the requested segment of media content at the requested ABR representation are generated by an RPVHS generation unit based on reconstructed pixel values and scalable stream information from the scalable encoder, and ABR stream information from the high-complexity ABR encoder. In addition, QA hint for the segment of the media content is generated by a segment-level QA based hint generation unit based on comparing the reconstructed pixel values from the high-complexity ABR encoder and the reconstructed pixel values from the RPVHS generation unit.

Also, although certain terms are used primarily herein, other terms could be used interchangeably to yield equivalent embodiments and examples. For example, the term "device" may be used interchangeably with "physical host", "physical machine", "physical device", or "communication device". Further for example, the terms "host", "transmitting device" and "sender" may be used interchangeably throughout the document. Furthermore, the terms "client", "recipient device", and "receiver" may be used interchangeably throughout the document. The terms "image", and "picture" may be used interchangeably throughout the document.

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system comprising:
    a media content delivery unit comprising:
        an interface unit to receive a request, from a media client, to obtain a segment of media content at an adaptive bitrate (ABR) representation of a plurality of ABR representations; and a transcoding unit comprising:
  a scalable decoder that receives a set of two or more layers of a scalable coded representation corresponding to the requested segment of media content at the requested ABR representation and decodes the set of two or more layers to provide a set of media frames and scalable stream information for the segment, wherein the scalable stream information comprises coding tree block level information for a plurality of coding tree blocks in a scalable stream for the segment, wherein the coding tree block level information comprises partitioning information for prediction, a specific prediction mode within a type of prediction for each prediction partition, and motion vectors with respect to specific reference pictures for each predicted partition;
  a hint stream decoder coupled to the scalable decoder, wherein the hint stream decoder receives a hint stream corresponding to the requested segment of media content at the requested ABR representation as a first input and the scalable stream information for the segment as a second input, and uses at least one of: a) the partitioning information for prediction, b) the specific prediction mode within the type of prediction for each prediction partition, and c) the motion vectors with respect to specific reference pictures for each predicted partition as predictors in a hint stream coding representation to decode the hint stream for providing transcoding hints for the segment as an output; and
  a re-encoder coupled to the scalable decoder and the hint stream decoder to receive the set of media frames and the transcoding hints, respectively, as inputs, and re-encode the set of media frames using the transcoding hints to provide an encoded bit stream corresponding to the requested segment of media content at the requested ABR representation for packaging and eventual delivery to the media client.

2. The system of claim 1, wherein the transcoding hints for the segment comprises information to substantially reduce the complexity of re-encoding the set of media frames within a bit-rate indicated for the requested segment of media content at the requested ABR representation.

3. The system of claim 1, wherein the media content delivery unit comprises:
  a QA hint based selection unit to:
    receive a quality assurance (QA) hint corresponding to the requested segment of media content at the requested ABR representation of the segment; and
    conditionally schedule the transcoding unit to generate the encoded bit stream of the segment for packaging and eventual delivery to the media client when the QA hint indicates that transcoding of the segment results in a quality greater than or equal to a reference quality.

4. The system of claim 3, wherein the QA hint based selection unit conditionally obtains a pre-packaged or unpackaged simulcast ABR stream corresponding to the requested segment of media content at the requested ABR representation for further packaging and eventual delivery to the media client, when the QA hint indicates that transcoding of the segment results in a quality less than the reference quality.

5. The system of claim 4, further comprising:
  a media client request agnostic streams preparation unit communicatively coupled with the media content delivery unit, that generates a set of layers of the scalable coded representation, hint streams, and QA hints using a subset of which any one of the plurality of ABR representations can be generated.

6. The system of claim 5, wherein the media client request agnostic streams preparation unit comprises:
  a high-complexity ABR encoder to generate, from a mezzanine input stream, a set of simulcast ABR streams, reconstructed pixel values for the set of simulcast ABR streams, and ABR stream information for the set of simulcast ABR streams according to an ABR recipe, wherein the set of simulcast ABR streams is generated at a first computational complexity level.

7. The system of claim 6, wherein the set of layers of the scalable coded representation, the hint streams, and the QA hint streams are generated such that a total storage requirements or first mile bandwidth requirements of the set of layers of the scalable coded representation, the hint streams, and the QA hint streams are substantially less than the storage requirements or first mile bandwidth requirements for the simulcast ABR streams.

8. The system of claim 6, wherein the ABR stream information comprises picture level information and coding tree block level information, wherein the picture level information comprises information selected from a group consisting of a picture type, reference pictures, scaling matrices for intra/inter and luma/chroma, and deblocking filter offset parameters, and wherein the coding tree block level information comprises information selected from a group consisting of the partitioning information for prediction, a type of prediction information for each prediction partition, a specific prediction mode within the type of prediction for each prediction partition, motion vectors with respect to specific reference pictures for each predicted partition, partitioning information for transform coding, and scalar or vector quantizer information at the transform partition level.

9. The system of claim 6, wherein the ABR recipe comprises at least one parameter selected from a group consisting of a coding format, a bit-rate switchable segment duration, an intra picture period, a number of temporal layers, a distance between two consecutive temporal base layer pictures, a spatial resolution, a frame-rate, a coded picture buffer size, a maximum instantaneous bit-rate, a bit-rate, and a ratio of bit-rates with respect to a bit-rate of a reference stream for each simulcast ABR stream in the set of simulcast ABR streams.

10. The system of claim 6, wherein the media client request agnostic streams preparation unit comprises:
  an ABR stream information analyzer to determine one or more groups of bit-rates that can be encoded with dependency through scalable encoding based on the ABR stream information from the high-complexity ABR encoder and the ABR recipe, wherein a lowest bit-rate in each group of bit-rates is a base bit-rate for the scalable coded representation.

11. The system of claim 10, wherein the media client request agnostic streams preparation unit comprises:
  a scalable encoder to:
    generate a set of layers of a scalable coded representation for each group of bit-rates by performing spatial scalable and SNR scalable coding of the mezzanine input at different resolutions or the reconstructed pixel values of the set of simulcast ABR streams corresponding to each group of bit-rates, wherein the scalable decoder receives and decodes the set of two or more layers of the segment from the set of layers corresponding to each group of bit-rates; and export reconstructed pixel values and scalable stream information corresponding to the set of layers of the scalable coded representation for each group of bit-rates.

12. The system of claim 11, wherein the set of layers of the scalable coded representation for each group of bit-rates is stored in a centralized storage unit for accessing by one or more transcoding units.

13. The system of claim 11, wherein the set of layers comprises at least one enhancement layer of the scalable coded representation and a base layer of the scalable coded representation, and wherein the base layer of the scalable coded representation for a group of bit-rates is a simulcast ABR stream within the set of simulcast ABR streams that corresponds to the lowest bit-rate within the group of bit-rates.

14. The system of claim 11, wherein the media client request agnostic streams preparation unit comprises:

reconstructed pixel values and hint stream (RPVHS) generation unit to generate reconstructed pixel values for each ABR representation and hint stream for each ABR representation based on the reconstructed pixel values and the scalable stream information from the scalable encoder, and the ABR stream information from the high-complexity ABR encoder.

15. The system of claim 14, wherein the RPVHS generation unit comprises:

a medium-complexity ABR encoder to generate a set of ABR streams at a second computational complexity level, simulcast stream information for the set of ABR streams, and reconstructed pixel values for each ABR representation using the reconstructed pixel values and the scalable stream information of the set of layers from the scalable encoder and the ABR stream information from the high-complexity ABR encoder, wherein the second computational complexity level is significantly less than the first computational complexity level;

a hint generator to generate transcoding hints corresponding to each ABR representation based on the simulcast stream information received from the medium-complexity ABR encoder; and a hint encoder to encode the transcoding hints corresponding to each ABR representation to provide the hint stream corresponding to each ABR representation, wherein the hint encoder uses the scalable stream information from the scalable encoder to encode the transcoding hints corresponding to each ABR representation.

16. The system of claim 14, wherein the RPVHS generation unit comprises:

a hint generator to generate transcoding hints corresponding to each ABR representation based on the ABR stream information received from the high-complexity ABR encoder;

a JIT transcoder simulator instance to receive, for each ABR representation, the corresponding generated transcoding hints, encode the reconstructed pixels values of the corresponding set of layers from the scalable encoder using the generated transcoding hints, and generate the reconstructed pixel values; and a hint encoder to encode the transcoding hints corresponding to each ABR representation to provide the hint stream corresponding to each ABR representation, wherein the hint encoder uses the scalable stream information from the scalable encoder to encode the transcoding hints corresponding to each ABR representation.

17. The system of claim 14, wherein the media client request agnostic streams preparation unit comprises:

a segment-level QA based hint generation unit to generate QA hints for a plurality of segments of the media content at each ABR representation by comparing the reconstructed pixel values from the high-complexity ABR encoder and the reconstructed pixel values from the RPVHS generation unit.

18. The system of claim 1, wherein the ABR representation for providing the segment of the media content comprises one or more resolutions, one or more different data rates and/or one or more different formats.

19. A method for providing adaptive bit-rate (ABR) streaming to a media client, comprising:

receiving, via an interface unit of a media content delivery unit, a request, from the media client, to obtain a segment of media content at an adaptive bitrate (ABR) representation of a plurality of ABR representations;

receiving, by a scalable decoder of a transcoding unit, a set of two or more layers of a scalable coded representation corresponding to the requested segment of media content at the requested ABR representation and decoding the set of two or more layers to provide a set of media frames and scalable stream information for the segment, wherein the scalable stream information comprises coding tree block level information for a plurality of coding tree blocks in a scalable stream for the segment, wherein the coding tree block level information comprises partitioning information for prediction, a specific prediction mode within a type of prediction for each prediction partition, and motion vectors with respect to specific reference pictures for each predicted partition;

receiving, by a hint stream decoder coupled to the scalable decoder of the transcoding unit, a hint stream corresponding to the requested segment of media content at the requested ABR representation as a first input and the scalable stream information for the segment as a second input, and using at least one of: a) the partitioning information for prediction, b) the specific prediction mode within the type of prediction for each prediction partition, and c) the motion vectors with respect to specific reference pictures for each predicted partition as predictors in a hint stream coding representation to decode for providing transcoding hints for the segment as an output; and receiving, by a re-encoder coupled to the scalable decoder and the hint stream decoder, the set of media frames and the transcoding hints as inputs, and re-encoding the set of media frames using the transcoding hints to provide an encoded bit stream, corresponding to the requested segment of media content at the requested ABR representation by the transcoding unit for packaging and eventual delivery to the media client.

20. The method of claim 19, wherein the transcoding hints for the segment comprises information to substantially reduce the complexity of re-encoding the set of media frames within a bit-rate indicated for the requested segment of media content at the requested ABR representation.

21. The method of claim 19, further comprising:

receiving a quality assurance (QA) hint corresponding to the requested segment of media content at the requested ABR representation of the segment; and conditionally scheduling the transcoding unit to generate the encoded bit stream of the segment for packaging and eventual delivery to the media client when the QA hint indicates that transcoding of the segment results in a quality greater than or equal to a reference quality.

22. The method of claim 21, further comprising:
when the QA hint indicates that transcoding of the segment results in the quality less than the reference quality, conditionally obtaining a pre-packaged or unpackaged simulcast ABR stream corresponding to the requested segment of media content at the requested ABR representation for further packaging and eventual delivery to the media client.

23. The method of claim 22, wherein the set of simulcast ABR streams, reconstructed pixel values for the set of simulcast ABR streams, and ABR stream information for a set of simulcast ABR streams are generated, from a mezzanine input stream, by a high-complexity ABR encoder according to an ABR recipe, wherein the set of simulcast ABR streams is generated at a first computational complexity level.

24. The method of claim 23, comprising:
determining one or more groups of bit-rates that can be encoded with dependency through scalable encoding by an ABR stream information analyzer based on the ABR stream information from the high-complexity ABR encoder and the ABR recipe, wherein a lowest bit-rate in each group of bit-rates is a base bit-rate for the scalable coded representation.

25. The method of claim 24, further comprising:
generating a set of layers of a scalable coded representation for each group of bit-rates based on the mezzanine input at different resolutions or the reconstructed pixel values of the simulcast ABR streams corresponding to each group of bit-rates by a scalable encoder, wherein the set of two or more layers of the scalable coded representation corresponding to the requested segment of media content at the requested ABR representation of the segment is received from the set of layers corresponding to each group of bit-rates; and
exporting reconstructed pixel values and scalable stream information corresponding to the set of layers of the scalable coded representation for each group of bit-rates by the scalable encoder.

26. The method of claim 25, further comprising:
storing the set of layers corresponding to each group of bit-rates in a centralized storage unit for accessing by one or more transcoding units.

27. The method of claim 25, wherein the set of layers comprises at least one enhancement layer of the scalable coded representation and a base layer of the scalable coded representation, and wherein the base layer of the scalable coded representation for a group of bit-rates is a simulcast ABR stream within the set of simulcast ABR streams that corresponds to the lowest bit-rate within the group of bit-rates.

28. The method of claim 25, further comprising:
generating reconstructed pixel values for each ABR representation and hint stream for each ABR representation by a reconstructed pixel values and hint stream (RPVHS) generation unit based on the reconstructed pixel values and the scalable stream information from the scalable encoder, and the ABR stream information from the high-complexity ABR encoder.

29. The method of claim 28, wherein generating the reconstructed pixel values and the hint stream for each ABR representation comprises:

generating a set of ABR streams at a second computational complexity level, simulcast stream information for the set of ABR streams, and reconstructed pixel values for each ABR representation by a medium-complexity ABR encoder using the reconstructed pixel values and the scalable stream information of the set of layers from the scalable encoder and the ABR stream information from the high-complexity ABR encoder, wherein the second computational complexity level is significantly less than the first computational complexity level; and
generating transcoding hints corresponding to each ABR representation by a hint generator based on the simulcast stream information received from the medium-complexity ABR encoder; and
encoding the transcoding hints corresponding to each ABR representation to provide the hint stream corresponding to each ABR representation by a hint encoder, wherein the transcoding hints corresponding to each ABR representation are encoded using the scalable stream information from the scalable encoder.

30. The method of claim 28, wherein generating the reconstructed pixel values and the hint stream for each ABR representation comprises:
generating transcoding hints corresponding to each ABR representation by a hint generator based on the ABR stream information received from the high-complexity ABR encoder;
receiving, for each ABR representation, the corresponding generated transcoding hints, encode the reconstructed pixels values of the corresponding set of layers from the scalable encoder using the generated transcoding hints, and generate the reconstructed pixel values by a JIT transcoder simulator instance; and
encoding the transcoding hints corresponding to each ABR representation to provide the hint stream corresponding to each ABR representation by a hint encoder, wherein the hint encoder uses the scalable stream information from the scalable encoder to encode the transcoding hints corresponding to each ABR representation.

31. The method of claim 28, further comprising:
generating QA hints for a plurality of segments of the media content at each ABR representation, using a segment-level QA based hint generation unit, by comparing the reconstructed pixel values from the high-complexity ABR encoder and the reconstructed pixel values from the RPVHS generation unit.

32. A non-transitory computer-readable storage medium having instructions that, when executed by a computing device, cause the computing device to:
receive, via an interface unit of a media content delivery unit, a request, from a media client, to obtain a segment of media content at an adaptive bitrate (ABR) representation of a plurality of ABR representations;
receive, by a scalable decoder of a transcoding unit, a set of two or more layers of a scalable coded representation corresponding to the requested segment of media content at the requested ABR representation and decode the set of two or more layers to provide a set of media frames and scalable stream information for the segment, wherein the scalable stream information comprises coding tree block level information for a plurality of coding tree blocks in a scalable stream for the segment, wherein the coding tree block level information comprises partitioning information for prediction, a specific prediction mode within a type of prediction for each prediction partition, and motion vectors with respect to specific reference pictures for each predicted partition;

receive, by a hint stream decoder coupled to the scalable decoder of the transcoding unit, a hint stream corresponding to the requested segment of media content at the requested ABR representation as a first input and the scalable stream information for the segment as a second input, and use at least one of: a) the partitioning information for prediction, b) the specific prediction mode within the type of prediction for each prediction partition, and c) the motion vectors with respect to specific reference pictures for each predicted partition as predictors in a hint stream coding representation to decode the hint stream for providing transcoding hints for the segment as an output; and receive, by a re-encoder coupled to the scalable decoder and the hint stream decoder, the set of media frames and the transcoding hints as inputs, and re-encode the set of media frames using the transcoding hints to provide an encoded bit stream, corresponding to the requested segment of media content at the requested ABR representation by the transcoding unit for packaging and eventual delivery to the media client.

33. The non-transitory computer-readable storage medium of claim 32, wherein the transcoding hints for the segment comprises information to substantially reduce the complexity of re-encoding the set of media frames within a bit-rate indicated for the requested segment of media content at the requested ABR representation.

34. The non-transitory computer-readable storage medium of claim 32, comprising instructions to:

receive a quality assurance (QA) hint corresponding to the requested segment of media content at the requested ABR representation of the segment; and conditionally schedule the transcoding unit to generate the encoded bit stream of the segment for packaging and eventual delivery to the media client when the QA hint indicates that transcoding of the segment results in a quality greater than or equal to a reference quality.

35. The non-transitory computer-readable storage medium of claim 34, comprising instructions to:

when the QA hint indicates that transcoding of the segment results in the quality less than the reference quality, conditionally obtaining a pre-packaged or unpackaged simulcast ABR stream corresponding to the requested segment of media content at the requested ABR representation for further packaging and eventual delivery to the media client.

36. The non-transitory computer-readable storage medium of claim 35, wherein a simulcast ABR stream and reconstructed pixel values of the simulcast ABR stream are generated, from a mezzanine input stream, by a high-complexity ABR encoder according to an ABR recipe.

37. The non-transitory computer-readable storage medium of claim 36, wherein the set of layers of a scalable coded representation is generated by a scalable encoder based on the mezzanine input at different resolutions or the reconstructed pixel values of the simulcast ABR stream.

38. The non-transitory computer-readable storage medium of claim 37, wherein the hint stream and reconstructed pixel values corresponding to the requested segment of media content at the requested ABR representation are generated by a reconstructed pixel values and hint stream (RPVHS) generation unit based on reconstructed pixel values and scalable stream information from the scalable encoder, and ABR stream information from the high-complexity ABR encoder.

39. The non-transitory computer-readable storage medium of claim 38, wherein the QA hint for the segment of the media content is generated by a segment-level QA based hint generation unit based on comparing the reconstructed pixel values from the high-complexity ABR encoder and the reconstructed pixel values from the RPVHS generation unit.

* * * * *